US006657628B1

United States Patent
Cook

(10) Patent No.: US 6,657,628 B1
(45) Date of Patent: Dec. 2, 2003

(54) METHOD AND APPARATUS FOR SPECIFICATION, CONTROL AND MODULATION OF SOCIAL PRIMITIVES IN ANIMATED CHARACTERS

(75) Inventor: Linda K. Cook, Sacramento, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/447,931

(22) Filed: Nov. 24, 1999

(51) Int. Cl.[7] .............................................. G06T 15/00
(52) U.S. Cl. ...................................... 345/473; 345/474
(58) Field of Search ................................ 345/473, 474; 382/236, 276; 704/276

(56) References Cited

U.S. PATENT DOCUMENTS

| | | | | |
|---|---|---|---|---|
| 5,774,591 A | * | 6/1998 | Black et al. ................. | 382/236 |
| 5,983,190 A | * | 11/1999 | Trower, II et al. .......... | 704/276 |
| 6,121,981 A | * | 9/2000 | Trower, II et al. .......... | 345/473 |
| 6,208,359 B1 | * | 3/2001 | Yamamoto ................... | 345/473 |
| 6,300,960 B1 | * | 10/2001 | DeRose et al. .............. | 345/474 |
| 6,369,821 B2 | * | 4/2002 | Merrill et al. .............. | 345/473 |

OTHER PUBLICATIONS

Argyle, M. and Cook, M., *Gaze and Mutual Gaze*, Cambridge University Press, New York, 1976. (table of contents).

Ekman, P. and Friesen, W.V., *The Facial Action Coding System: A Technique for the Measurement of Facial Movement*, Consulting Psychological Press, Palo Alto, 1978. (not available).

Knapp, M.L. and Hall, J.A., *Nonverbal Communication in Human Interaction*, 4th Edition, Holt, Rinehart and Winston, Inc., 1997. (not available).

Parke, F.I., "A Parameterized Model for Facial Animation," IEEE Computer Graphics and Applications, 2(9):61–70, 1982.

Roehl, B., "Specification for a Standard Humanoid," H/Anim—Human Animation Working Group, http://ece.u-waterloo.ca/~h–anim/spec1.1/#modeling.

* cited by examiner

*Primary Examiner*—Mark Zimmerman
*Assistant Examiner*—Huedung X. Cao
(74) *Attorney, Agent, or Firm*—Fliesler Dubb Meyer & Lovejoy LLP

(57) ABSTRACT

Non Verbal Behaviors (NVBs) are parameterized and selected for using in enhancing communicative abilities of an animated character. A parameter selection device selects the NVBs from a database of NVBs based on selection criteria consistent with a response or action generated by an animated character program. The selected NVBs are modulated based on an emphasis to be placed on the communication, and other factors, such as a personality of the animated character. The modulated NVBs are placed in a data stream of NVBs and other actions and communications, including, for example, language, that is provided to an animation system for display. The processes of the present invention allow for NVBs to be utilized to more effectively engage users of the animated character. The processes of the present invention may be applied in any animated character system including products by Microsoft (Office Assistant, Agent, etc.).

9 Claims, 11 Drawing Sheets

Determine Degree (Modulate)

Social Primitives (and NVB) Listing

METHOD AND APPARATUS FOR SPECIFICATION, CONTROL AND MODULATION OF SOCIAL PRIMITIVES IN ANIMATED CHARACTERS

BACKGROUND OF THE INVENTION

1. Field of the Invention

This invention relates to human-computer interfaces (HCIs), and particularly to animated characters utilized as an HCI. The invention is more particularly related to the display of Non Verbal Behaviors (NVBs) of an animated character. The invention is still more particularly related to the paramaterization of NVBs for specifying NVBs for display on the animated character. The invention is still further related to the modulation and regulation (selecting an amount of specific non-verbal behaviors, and combining different channels of NVB) of non verbal behaviors of the animated character communicating with a user.

2. Discussion of the Background

Autonomous synthetic computer characters have become a technological and commercial reality in the last few years, both as alternative user interface mechanisms and as entertainment devices. The Microsoft Office Assistant, Microsoft Agent, IBM's Warp Guide, and Extempo's Imp Software are all recent attempts to commercialize user interface technology developed over the last decade at academic research institutions. The explosion in computer games which utilize synthetic characters and their increased use in television and motion pictures also indicate a strong demand for advances in this technology.

One such advance is the basic action selection architecture (BASA) developed in the ALIVE project at the MIT Media Lab. The BASA is used for run-time simulation of characters in deliverable applications.

In the BASA, behaviors are arranged in a hierarchy with those at the top of the hierarchy being more abstract categories of behavior and those at the bottom being operational in that they have simulation routines associated with them which allow the character to perform them when commanded. Behaviors at each level in the hierarchy compete every time step of the simulation for control of the character. The result of this competition is one primary behavior, which is the primary action the character performs at that time step.

However, most of the research and development in this area to date has been on realistic rendering, real-time animation, and "functional" behaviors, while the issue of character individuation through the use of patterns of Non Verbal Behaviors (NVBs) that are unique, consistent, and predictable over time are typically left for an animator or script writer.

SUMMARY OF THE INVENTION

The present inventors have realized the need to produce algorithmically controlled low level unconscious behaviors, referred to herein as social primitives (SPs), included in a class of Non Verbal Behaviors (NVBs) in animated characters in order to provide a more communicative and engaging interface. The invention provides a method for implementing an animated character (on a computer or other electronic device), using social primitives for interacting with human users. The invention provides a modulation of selected Non Verbal Behavior (NVBs) channels, which include but are not restricted to such items as facial expressions, eye contact, eye direction, gestures (pointing, for example), and tone of voice.

The SPs are parameterized based on qualities related to a communication being performed by the character. The SPs may be language independent, played alone on the character, or may be in conjunction with verbal communications (language dependent behaviors). Other SPs may also be utilized to help define or refine actions taken by the character when no communications are being made (language independent behaviors).

The invention may be performed by a device comprising at least one action module configured to determine at least one communication (verbal, non-verbal, or a combination of both) from an animated character to a user, including, a selection mechanism that identifies at least one channel of Non Verbal Behavior (NVB), and one or more behaviors (including SPs), to be utilized in said communication that at least one of performs or supplements said communication.

The invention includes a method, comprising the steps of identifying a communication to be made by an animated character, determining a set of at least one Non Verbal Behavior (NVBs), that at least one of supplement and perform said communication, and playing said set of NVBs on said animated character.

Both the device and method may be conveniently implemented on a general purpose computer, and the results may be displayed on a connected output mechanism or transmitted to a remote output mechanism for display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
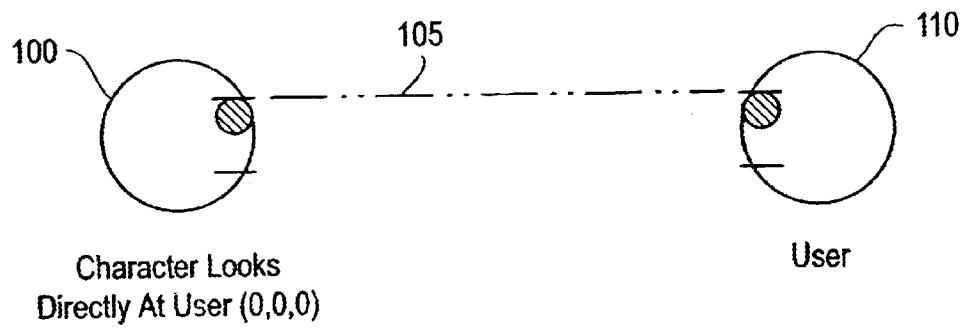
FIG. 1A is an illustration of a first head_orientation_to_user parameter.

The present inventors have realized that numerous channels of Non Verbal Behaviors (NVBs) conveying both Social Primitives (SPs) and higher level behavior patterns play an important role in human communications. The present invention utilizes one or more channels of NVB to engage human users in interacting with animated characters.

The SP's can be described in two ways: short text descriptions or within a particular programming specification (i.e. animation). The text descriptions summarize experimental findings (from various disciplines, including, psychology, linguistics, communication, and anthropology) about how and the conditions under which those behaviors occur. For the most part, these behaviors are largely unconscious, acquired at an early age and are essentially automatic. Some examples would include: changing the size of the pupil, radius of scan when one individual looks at the face of another or the head following the hand gesture of pointing when a speaker references some object (or person) while speaking. Since the basic properties of behaviors can be described they can also be modeled or expressed in a number of different animation programming languages. Some examples include VRML (Virtual Reality Modeling Language) programmatic specifications or Facial Animation Parameters (FAPs) or Body Animation Parameters (BAPs) now becoming a standard for the MPEG4 data streaming technology (particularly for facial animation).

The present inventors have realized that head and eye movements related to listening habits, and as part of NVBs during communications by animated characters provide a character that more effectively engages human users. Characters having human eye movements coordinated with other activities associated with human communication draw into and engage human users in conversation more easily and intently.

Realistic control of the character's eye gaze involves at least one of the gaze-related features listed below. In one embodiment of the present invention, these features are parameterized to identify actions (NVBs) that the character may be tasked to perform to enhance the characters communications with the user. The parameters may be set at a compile time or run time of the character according to the character's script and/or a designated personality bias of the character. The parameters may then be modified during run time (execution of a character program that specifies actions and communications of the character)

A compile time parameter setting is specified to be a semi-permanent feature of an animated character's personality bias. Parameter settings chosen at compile time add to the stability and consistency of character behaviors much like behaviors in humans that are also consistent. However, a parameter set modified during run time may also be a permanent feature of the characters personality, but is not specified until specific input, situations, problems, etc are presented to the character.

Personality of a character (including personality bias) may be established in many ways. One example includes Cook et al. (hereinafter Cook), U.S. Pat. No. 6,349,037, U.S. Pat. application Ser. No. 09/287,521, entitled "SYSTEM FOR DESIGNING AND RENDERING PERSONALITIES FOR AUTONOMOUS SYNTHETIC CHARACTERS," filed Apr. 07 1999, and incorporated herein by reference in it's entirety. Cook includes a device for generating an animated character personality by setting specific quantities of traits on a personality workbench, those traits are then compiled into a personality profile (character profile) for display by an animated character.

Parameters may be modulated based on specific actions performed by a character, or be changed during execution of the animated character (based on any criteria, e.g. world events, change in goods, etc.). In addition, new parameters may be added and existing parameters may be changed to an entirely new value, or modulated via a predetermined input or other event.

In an embodiment of the present invention, using Cook, parameters are set based on the specific quantities of traits selected at the personality workbench, and compiled into the character's behavioral hierarchy. In another embodiment, the traits selected from the workbench are correlated to a specific set of parameters and modulation values or identify a set of rules that identify parameters that may be selected during execution of the character's program.

In general, a subset of the below listed parameters may be utilized in order to provide enhanced engagement of animated character users, or facilitate "true" believability. At some point, adding additional parameters may not yield an increase in believability that would warrant the technological costs or computational intensity to support their inclusion (they may not buy as much believability as more important parameters, e.g., foot tapping being less important than eye gaze, for example), because a point of diminishing returns may have been reached. However, with increased computation processing power, as is envisioned in future workstations, more channels (NVBs) will be added to further facilitate user engagement.

The present invention includes NVB channels for supporting head movement, eye positioning, eye movements, and gaze. Much of user engagement is realized with appropriate eye control. For example, Both of parameters "character gaze at user," and "mutual gaze" (user returns eye contact) are established almost entirely by the position of the eyes. While the head may also play an important role, the head need only be in a position to physically support the user being seen through the character's eyes.

Below are listed three groups of gaze and eye related parameter sets: orientation and movement characteristics; timing parameters and language, cognitive, or other factors that are implemented in the present invention. At least one of the listed features is needed for proper eye control for user engagement.

Orientation and Movement Characteristics (Parameters)

These parameter sets for movement and orientation of the head directly tie generic animation software for modeling and animation to experimental findings that suggest both methods and strategies for more effective use of that software; including: rules for position, articulation, range, intensity. appropriate contexts and other aspects of animation techniques.

head_orientation_to_user—Anchored at a "0" plane (x,y,z) where the character's head (i.e. frontal plane) would be in-line with the user's head or body location (essentially look at the user's eyes). Referring now to FIG. 1, this parameter is the number of degrees a character's head 100 is off a "0" plane 105 (0,0,0 coordinates in 3-D space). Qualitative values may be imposed on ranges (i.e. values such as "on_user" or "off_user"). On user (shown in FIG. 1A) indicates direct contact, i.e., character 100 appears to be looking directly at user 110.

Figure 1B:
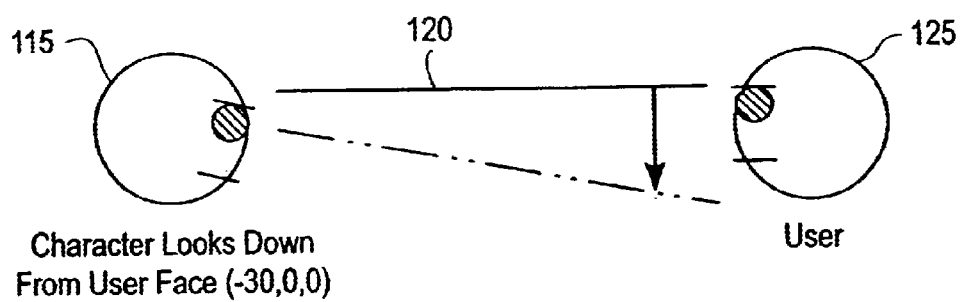
FIG. 1B is an illustration of a second head_orientation_to_user parameter.

Off_user indicates that the character is not looking directly at the user and may be further qualified (modulated) by rotation along 3 axis (x,y,z) through degrees of displacement. The amount and direction of the rotation is determined by various personality traits of the character. For example, FIG. 1B shows a 30° rotation of the character's head 115 along the x axis from the "0" plane 120 that emanates from the character 115 to the user 125. This downward rotation indicates, for example, that the character has a degree of shyness or introvertedness in the character's personality. In another example, a rotation above or to either side of the user would indicate, on a warm. cold scale, less warmth in the character's personality (avoiding direct eye contact and interaction). NOTE: A "0" value head orientation implies only that the character's head is pointed directly towards the user. To "look" at the user requires the following conditions: the character's eyes actually scan the user's face (i.e. around the user's eyes) and the character's head is in a position to support that level of contact (i.e. in the physical world the character could actually "see" the user). Mutual gaze requires the above two conditions and a third: the user's eyes are oriented in a similar way towards the character. In other words the character's head can probably vary quite widely from "0" and still support eye-contact.

Figure 2:
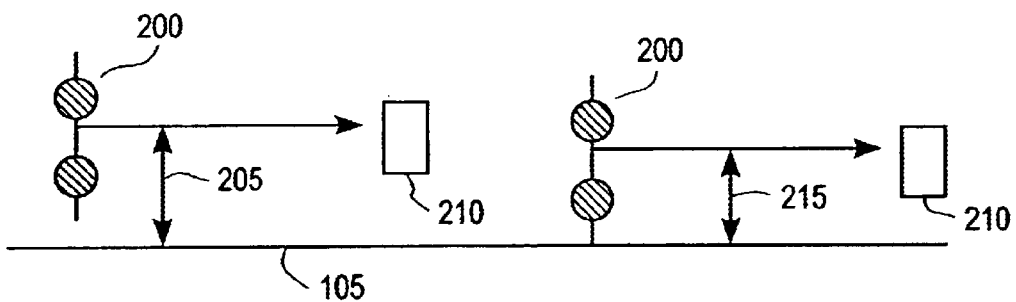
FIG. 2 is an illustration of an eye gaze to user parameter that identifying an absolute distance from a zero plane of eye orientation of an animated character to a user.
Figure 3:
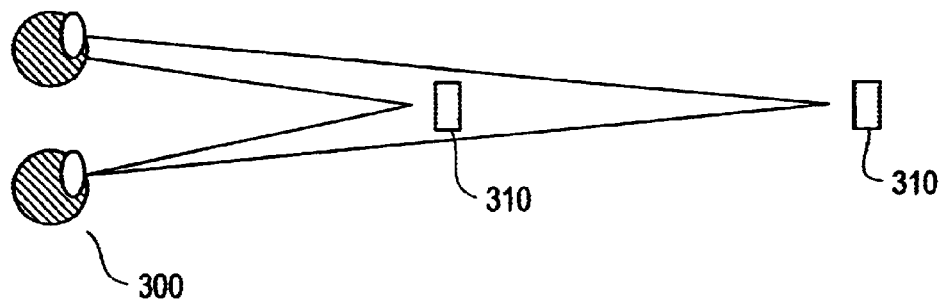
FIG. 3 is an illustration of an eye convergence to user parameter identifying a convergence of animated character eyes to a user.

In a process of one embodiment of the present invention, a "0" plane is established between the character and a user and the character's gaze is either set On_user or Off_user based on the character's personality profile (character profile). If Off_user, the gaze is further modulated based on specific traits and amounts of those traits in the character profile. In this and other embodiments, similar methods may be utilized to implement any parameters and/or characteristics of the character.

eye_gaze_to_user—The absolute distance (205, 215) from the "0" plane 105 where the character's eyes 200 (referring to FIG. 2) are oriented towards the user 210.

eye_convergence_to_user—The degree of convergence performed by the eyes 300 (referring to FIG. 3) in order to keep the user 310 (or room object) in focus. Convergence is important for a realistic look as users can easily detect when a character is not really looking at them.

radius_of_eye_gaze_scan—The space in which the characters eyes will rapidly scan the user's face. A gaze with a very small or no scan radius would equal a "stare", a moderate scan radius seen as neutral and a larger scan radius perhaps nervousness (e.g., emotional stability) or anxiety.

eye_shift_frequency—How often will the character's head move (or shift) from its current location. There are several ways to control this: ratio-based, in which a head shift occurs once every n seconds; linguistic-based, the head shifts at syntactic breaks or thought unit breaks; cognitive-based in which agent's internal "thinking state" might reflect a preparation of a response to a non-factual question posed by user. The first of these is probably the most useful as the latter two will probably be more appropriate for eye movements. As an example of a ratio-based control, a shy person will probably look away from a user at a much higher rate than a less shy person.

Eye_shift_direction—One of north, south, east, west and northeast, northwest, etc. May be based on shifts that are linguistic-based, cognitive-based as described above, a personality bias (i.e. shy) or other external factors (e.g. inputs), or via algorithmic or random selections.

head_to_eye_coordinates (the head shift can occur with or without a coordinated movement by the eyes.

This is the problem of slight shifts in the head in which an overall change in head orientation may or may not be accompanied by a comparable movement of the eyes (i.e. we may shift our head slightly but still maintain eye contact).

head_shift_distance—How far the character's head shifts from current location.

head_gaze_to_object—Same as for "head_gaze_to_user" but focal point is an object rather than a user.

head_track_rate—How closely does the character monitor the user as the he moves around the physical "environment." In tracking, the eyes follow until they can no longer keep user in its track and then the head shifts to accommodate continued eye gaze.

Timing Characteristics and Parameters for Head and Eyes

Maintaining and tracking time-related factors for head and eye movement will be crucial for later modulation of these factors (i.e. duration of eye gaze must be calculated from time of onset to offset or current time. Some timing factors include the following:

onset_of_current_head_orientation—Once the characters head is positioned (x,y,z coordinates are temporarily fixed and stable) will require registration of the start time of that position.

offset_of_current_head_orientation—The time stamp at the point in which the character changes head orientation.

duration_of_head_orientation—Must be calculated and monitored in real time. Duration is equal to current time minus onset of head orientation.

onset_of_eye_gaze—A time stamp that begins when the character's eyes fixate at some point in space.

offset_of_eye_gaze—An ending time stamp that marks the time when the character's eyes move from a current fixation point.

duration_of_eye_gaze—Calculated in real-time and is equal to current time minus onset of eye gaze or offset_of_eye_gaze.

Language or Cognitive Behaviors and Control Factors

Conversation or cognitive based NVBs represent NVBs that are directly tied to higher intellectual functions such as language generation or cognitive process. Current parameters include, but are not limited to Head Nods, short Vocals (also considered non verbal behavior), smiling, gaze and mutual gaze, blink rate, and various miscellaneous modulation specifications are provided below:

Head Nods and Short Vocals (Back Channel) (parameters)

Nod Rate. Nod rate is the number of nods (up and down) per user's speaking time (i.e. during character's back-channel of speaker). In general, the average rate of back-channel nods is about 1 nod every 17 seconds.

Short Vocal Back Channel Rate

Appears as a back channel behavior in which a character makes utterances such as "Mmm" or "Yes" while partner is speaking. On average, short vocals occur once every 23 seconds.

Smiling

Smile-Extent While Speaking

The number of smiles performed by a character while speaking. Generally occurs about once every 36 seconds or about $\frac{1}{8}^{th}$ of speaking time.

Smile-Extent While Not Speaking

The number of smiles performed by a character while either listening or during other behaviors. Statistical data are inconclusive but trends are well documented: women smile more than men, children more that adults, and lower socioeconomic status more than higher socioeconomic status.

Gaze and Mutual Gaze

Saccadic Movement—Eyes

Saccadic eye movement is a series of rapid, repeated scans of several parts of the face (predominantly the eyes and the mouth) resulting in rapid changes in points of fixation. (Both eyes move at the same time.) Direct eye contact is on the average about 50% of the time while conversing. Reproduction of the speed and physical capacity of human eye cannot always be replicated because of timing problems and structural differences (eyes are sometimes modeled as 2D rather than as 3D spheres). Some statistics include: angular shift is between 2–5 minutes and 20 degrees of arc;

speed of rotation is great—up to 1000 degrees/second.

Gaze When Character is Speaking (Has Turn)

For the most part gaze behavior is grammar dependent (i.e tied to the character's sentence structure). Character should glance at speaker (for feedback) for the following: grammatical breaks; end of thought unit or end of utterance.

Point of Yielding Turn

Occurs as the character transitions from speaker to listener. At end of utterance character's gaze continues until user assumes speaking role at which point character looks away momentarily.

Generic Gaze Rules

The following rules are general purpose:

At the start of a conversation the character has a higher rate of gaze. Helps to ensure that the listener is listening.

At the close of a conversation character begins to lower his rate of gaze.

When the character acts as a listener there should be an increase in gaze rate (beyond the 50% suggested above).

If user confers with another user it lowers the gaze rate of the user

Periodic Blinking and Blink Rate

Blinking is a functional need to protect eyes (ensures moisture in the eye). The average blink rate is 12.5 times per minute (See: Argyle, M. & Cook, M. (1976). Gaze and mutual gaze. New York:Cambridge University Press, for example) o 6–12 times per minute (See: Knapp, M. L. & Hall, J. A. "Nonverbal Communication in Human Interaction", $4^{th}$ Edition, Holt, Rinehart and Winston, Inc. 1997, for example). The length of a blink is 0.2–0.3 seconds.

Producing NVBs

Computer character animation relies on two basic components: a model or representation of the physical structure of the character (i.e. face and/or body) and the way it is animated or moves. Models considered for the present invention are assumed to be polygonal (or triangular) meshes with a series of vertices that join the polygons together. There have been a number of different approaches to modeling the human body (e.g., H-ANIM (Roehl, B. Specification for a Standard Humanoid, H/Anim—Humanoid Animation Working Group), see FIG. 8).

Animation, particularly facial, is mesh deformation achieved through movement of one or more vertices in a specific direction (both unidirectional and bi-directional). Such movement is specified by sets of parameters that describe the range of movement or articulation for a particular segment or control point outlined in the model.

The Relationship between Behavioral Channels. Parameters and NVB's

Figure 8:
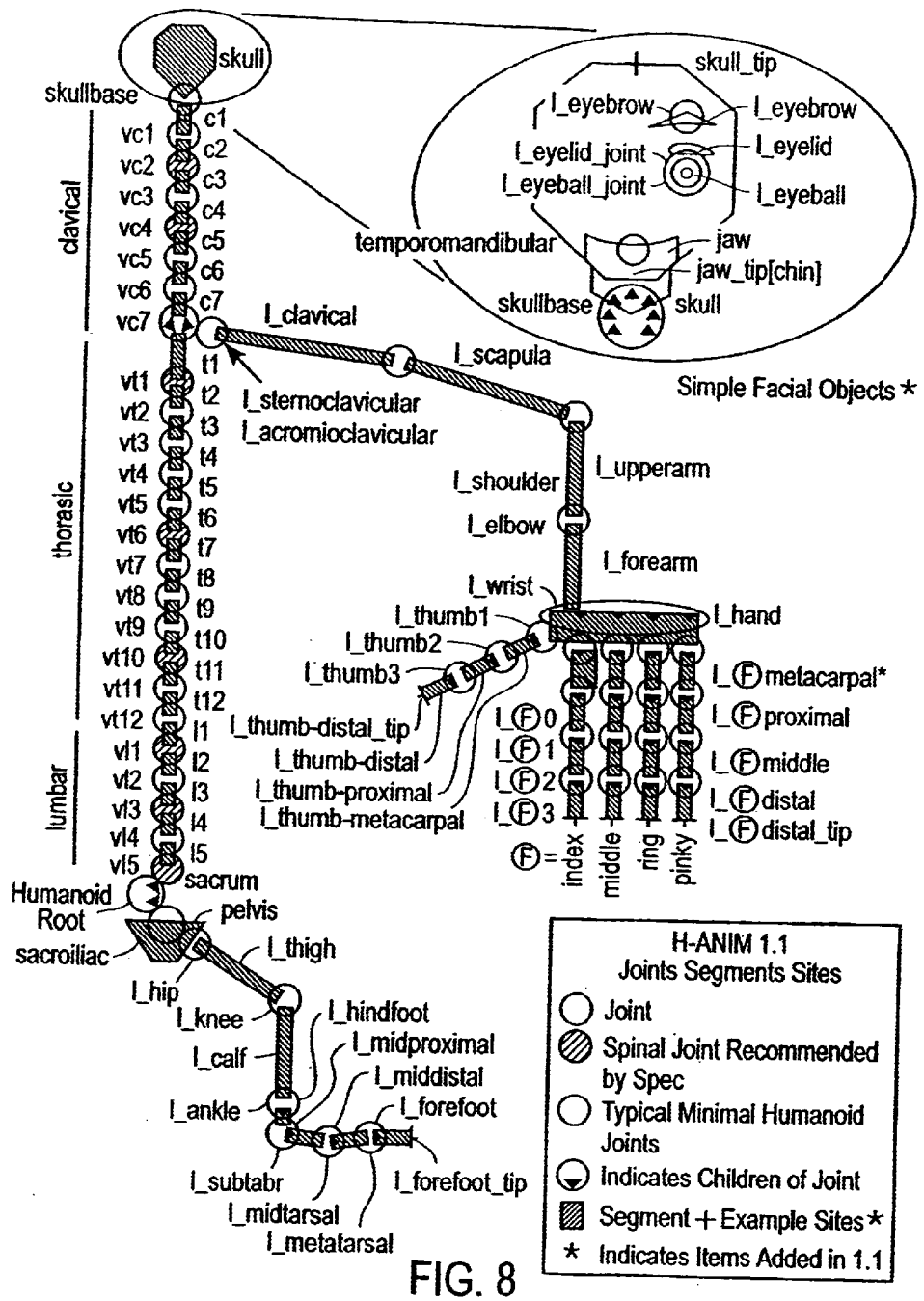
FIG. 8 is an example of a human body model, joints, segments and points of articulation.

As FIG. 8 illustrates a model may have a number of control points depending upon model complexity. In the present invention, each of the named points in the model (i.e. left inner eye) corresponds to either a channel or partial NVB channel which may be controlled programmatically either individually or in some combined form. Generally, control parameters range in value from 0 to 1. So, for example, the eyelid at a 0 position would be closed; at 1 it would be wide open. Each channel may be set via a function call or can also be manipulated by "sliders" in which a slide control is connected directly to the control point in the model and can incrementally increase or decrease the value associated with the control point. So for example, the slider can smoothly open and close an eye. Animation can be accomplished either frame by frame or through "tweening". In frame-by-frame a channel or set of vertices can be re-drawn at different time points such as achieved by a slider. In "tweening" a control point or set of vertices are given both a beginning (0) and ending point (1) of articulation and an animation system automatically interpolates (or other algorithmically generated procedures) a series of frames between the two anchor points.

Figure 7:
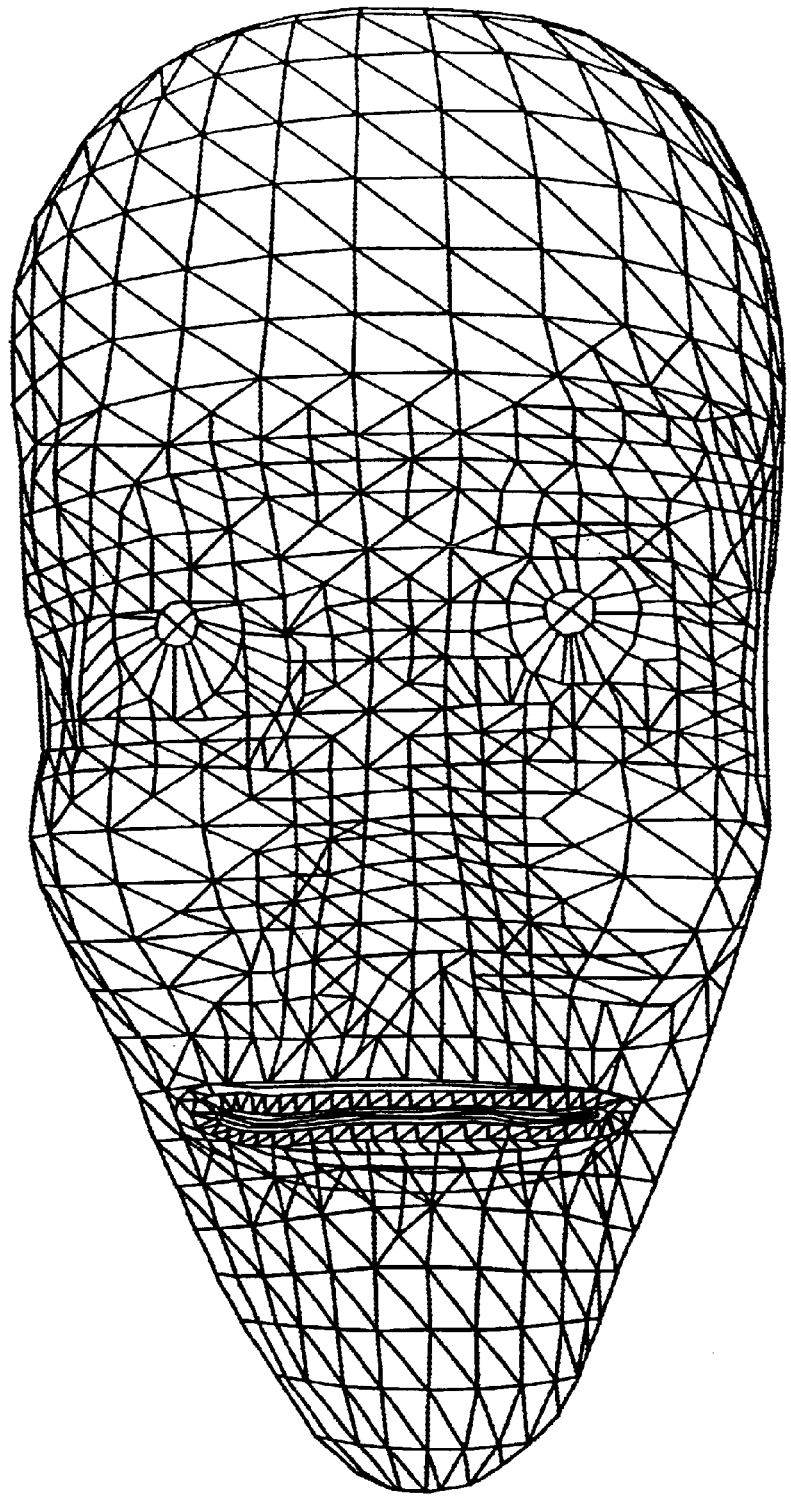
FIG. 7 is an example of a polygon mesh as an underlying model of a physical structure of a character to be animated.

In addition, the MPEG-4 international standard has provided parameters for both Facial Definition Parameter (FDP) and Facial Animation Parameter (FAP) that may be utilized to specify actions to the model of FIG. 8, or the mesh of FIG. 7. These parameter sets are designed to allow the definition of a facial shape and texture, as well as animation of faces to reproduce expression, emotion and speech pronunciation. The FAPs are based on the study of minimal facial actions and are closely related to muscle actions. These base sets of facial actions allow for the representation of most natural facial expressions. Other parameter sets specifying amounts, degrees, or other motion values of the models may also be utilized. (See, for example, F. I. Parke. A parameterized model for facial animation, IEEE Computer Graphics and Applications, 2(9):61–70, 1982) and Ekman, P. & Friesen, W. V. (1978). The Facial Action Coding System: A Technique for the Measurement of Facial Movement, Palo Alto: Consulting Psychological Press.

Channels of control that arise from a FAP definition (or other parameter set) are generally at a low level since they are tied in part to an anatomically correct representation of the structural/muscular relationship. One or more control points may be involved in a single NVB channel; a smile for example having several muscles (control points) that function together (movement of polygons on the mesh of FIG. 7, for example) to produce the smile. In the MPEG-4 standard these parameters have been provided ranges of movement. With the exception of a very small set of control points in the face (i.e. pupil dilation) most individual parameters of the set will need to work together in order to display a particular facial effect. For example, there are inter-FAP constraints that can be specified for the representation of six major emotions (joy, sadness, anger, etc.).

There are several problems with the current representation (particularly facial expression):

In terms of facial expression, the level of granularity in their representation of emotional state is large and restricts the ability to express individual differences. The set of facial expressions they create are common across all characters since the basic facial features are defined in terms of a distance ratio algorithm (i.e. distance between the eyes, eyes to mouth, mouth to nose). These abstract dimension-based relationships enable a global definition for any face that will change consistently to conform to different face shapes. This is a direct benefit for "morphing" from one face into another, however, a more important by-product of this relationship is that all characters appear to show the same emotion in exactly the same way.

The process by which more finely grained or subtle behavioral expressions can be displayed using a priori defined links have not been developed; including subtle behaviors such as eye fixation and the saccadic movements within that fixation.

There are no implementation strategies for the display and coordination of (independent in terms of the parameter set utilized) multiple NVB behaviors (based on one or more FAPs) that may occur either synchronously or a synchronously.

There is a need for a larger set of behaviors which give rise to more compelling and human like characteristics. Some examples include: various aspects of character to user gaze; eye shift during speaking or listening, saccadic eye movements. Such behaviors must be algorithmically controlled, subject to modulation (i.e. change in degree of expression) and made available for use by a character when circumstances warrant.

The present invention addresses the need for a broader, more consistent and algorithmically controlled approach to combining FAPs (and in the future BAPs or Body Animation Parameters when those standards are completed) or other parameter sets. In the present invention, a partitioned database of social behaviors that increases ease of access to those behaviors and enables an animation system to select the most meaningful behaviors first and add additional behaviors (that increase a character's behavioral complexity) incrementally where time and situation dictate (i.e. low bandwidth versus high bandwidth) Second, the present invention provides a method and architecture to implement these behaviors during character animation making the character more lifelike, believable; and engaging to human users.

The Social Layering of Behaviors:

Each level in the database hierarchy contains increasingly more complex behaviors ("social layering"). Those lowest in the hierarchy represent basic movement parameters like the FAPs just discussed. The next layer in the hierarchy represents the low-level unconscious social primitives also just described above. As an example, maintaining a normal rate of saccadic eye movement prevents the sense that the character is staring at the user. Upper levels in the hierarchy are built from the lower levels with the added constraint that the behaviors within higher levels must be coordinated in a manner to effectively display more complex behaviors seen in behaviors that might be goal related, event reactions, or trait-based personality biases.

This layering will create characters who are first, more realistic because their behavior not only reflects what is socially typical for humans (which, when missing is noticeable) reflected particularly in the lower level social primitives. Behaviors can also be orchestrated in such a way as to create individuated characters (i.e. show individual differences) across a wider realm of interactions besides conversations such as goal oriented or event related. Finally, because each level is considered to be under algorithmic control, these individual differences are consistent and enduring, and can essentially implement the "personality" of the animated character.

The Behavioral Hierarchy

Level 0: Animation Units at the Muscular/Structural Level

The current set of FAPs supposedly provides complete coverage of the basic facial movements that are necessary for the display of most of the natural human facial expressions. At the present time the standards committee (ref) and related research groups have focused primarily on FAPs for speech production (i.e. mouth positions needed for displaying visemes) and some emotional expressions. (Body Animation Parameters or BAPs are due out in December of 1999.) Parameters involving translational movement are represented in terms of Facial Animation Parameter Units (FAPU) like those shown below. This unit of definition is universal for any facial model and produces consistent behavior for facial expression and speech pronunciation.

ESo=Eye Separation; ES=ESo/1024

ENSo=Eye–Nose Separation; ENS=ENSo/1024

MNSo=Mouth–Nose Separation; MNS=MNSo/1024

MWo=Mouth–Width; MW=MWo/1024

For representational purposes each FAP contains a name, short description, and whether the parameter is unidirectional (only positive values) or bi-directional, definition of the direction of movement for positive values, group number for scalability, FDP subgroup number and quantization step size.

Level I: Low Level Social Primitives

We assume that social primitives must be defined in terms of the rules that describe their animation requirements (i.e. range of articulated movement of specific FAPs) and the context under which they occur. In this representational systems FAPs are seen as the building blocks upon which the social behaviors may not only be directed but also modulated.

As an example, control over the inner-left eyebrow which may be raised from a resting state (0) to the top of a translational path (1) can express doubt. As another example, the radius of saccadic eye movement can be varied by different parameter settings to achieve one of several states based on rate and distance of movement: anxiety, fear or a neutral state.

Social primitives may be realized in the behavior of a character as a single discrete behavior (such as the raising of the inner eye brow above) and is referred to as a discrete social primitive. Its database properties include the following:

Is made up of one or more FAPs can occur as an isolated behavior and convey meaning. They are similar to a phoneme which is the lowest meaningful sound made in the human language;

in some cases a discrete social primitive may be equivalent to a single FAP behavioral channel or may represent several inter-dependent FAPs that occur in unison (a smile requires several FAPs);

all control points have a range of modulation in which qualitative values can be imposed and labeled in a meaningful way (i.e. blink rate of 6–12 is "neutral"; blink rate of 1–5 "conceptual" and >15 indicates "anxiety" (As with all ranges or rates of change, movement, etc., presented herein, other categories and specific ranges, rates, etc. may vary).

Other social primitives must co-occur in order to convey the meaningful intent of the behavior. Co-occurrence may either be synchronous or asynchronous. Co-occurring synchronous social primitives are compounds of discrete social primitives that must occur simultaneously (i.e. must be performed in unison). As an example, establishing mutual gaze requires a neutral level of saccadic eye movement, that the eyes be oriented towards or looking at the user and the head be in a position to support the appropriate eye fixation.

Co-occurring social primitives that are asynchronous consist of behaviors that are played out in time and may partially overlap, not overlap at all with each other and may or may not have a time dependency between them. As an example, during a greeting it is customary to first orient the head and eyes toward the user, establish a short fixated gaze, orient the body towards the user and walk a few steps forward. All behaviors occur sequentially with only minimal (if any) overlap in their onset.

Contexts

In addition, all social primitives (discrete or co-occurring) are elicited by specific contexts. The appearance of one or more behaviors in an inappropriate context would suggest that the character lacks some degree of social intelligence and has the potential to affect the veracity of the interaction with a user. In terms of the present invention contexts are generally seen as the antecedents that are necessary for performing a specific behavior and form the basis of the antecedent conditions of a simple IF THEN rule representation format. Various contexts in which social primitives occur include all human interaction situations that can be defined but currently include the following categories:

Linguistic—generally assumed to be contained within a language act (i.e. interaction with another) and includes take-turn, back-channel, begin-utterance, end-utterance, yield-turn.

Social Situation—can be unlimited but currently includes: greeting behavior, signing off, wait mode.

Role of character and related tasks—often defined by what the character is intended to do (i.e. teach) and can include such things as explanation, providing help, questioning mode.

Event Reaction—generally constrained to user-generated events such as interrupting the character while speaking, detecting another person joining user, or user walks away from character.

Regulatory Mechanisms of the Social Primitives

Social primitives also contain a form of meta-knowledge that dictates various performance boundaries such as duration or frequency of the behavior. Listed below is a subset of regular mechanisms that can be used to constrain, intelligently, the rendering of social primitives. It is important to understand that social primitives will only be regulated by those boundaries for which it makes sense. Thus, a greeting behavior would probably not be regulated by a repetition factor whereas a smile would.

Figure 4:
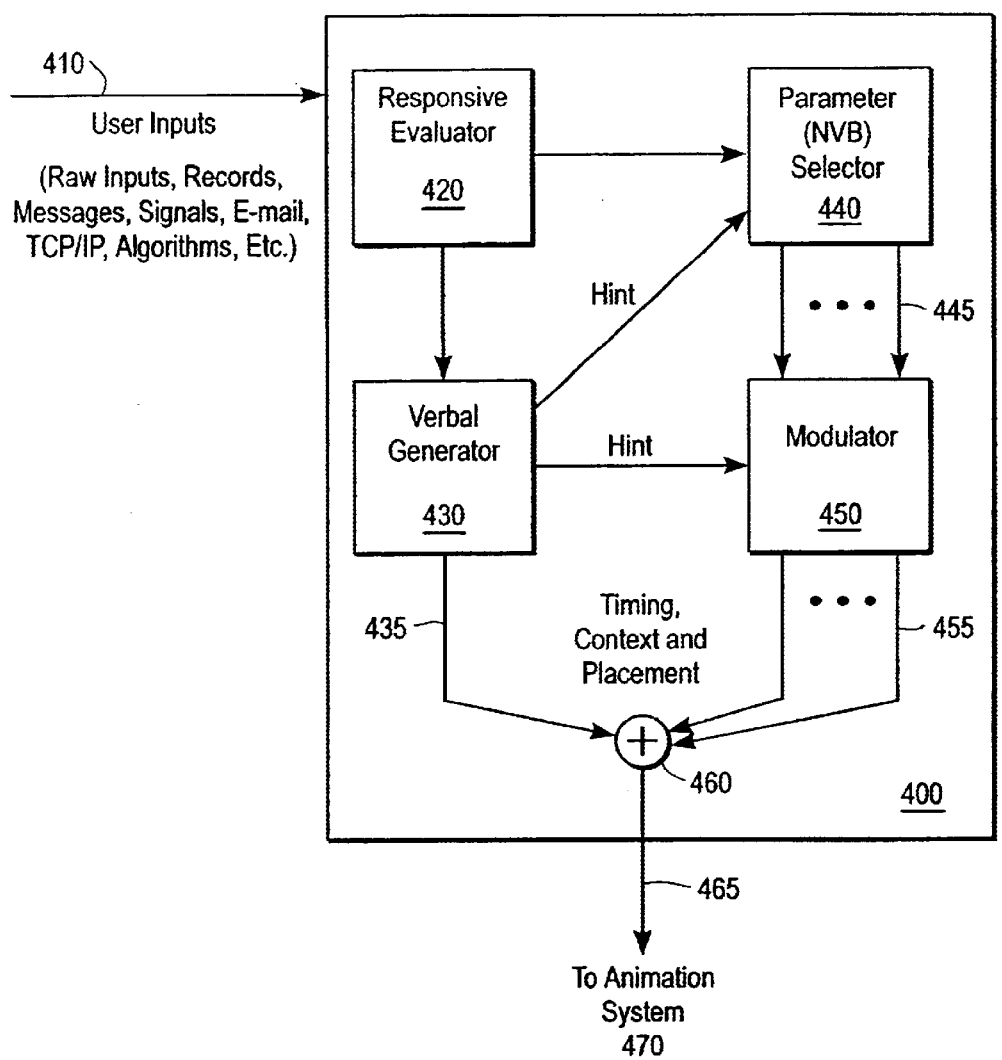
FIG. 4 is a block diagram of one embodiment of the present invention.

Timing parameters:
  onset, offset, duration
Repetition factors (frequency of behavior)
  fixed ratio (every n seconds)
  variable ratio (varies within a range)
  linguistic-based (breaks in syntax breaks)
  cognitive—preparing a factual statement;
strength of expressiveness or intensity
  size of gesture space used
  abruptness of behavior Referring again to the drawings, wherein like reference numerals designate identical or corresponding parts, and more particularly to FIG. 4 thereof, there is illustrated one embodiment of an action device 400 that utilizes parameters for controlling NVBs of an animated character. User inputs 410, including any of Raw inputs from a vision system (providing a user location or movements, for example), an audio receiver (e.g., microphones), other input devices, packaged data received from an input device and packaged in any of a message, signal, email, TCP/IP formatted message, or an output from an algorithm, are input to the action device 400.

The user inputs 410 are forwarded to an evaluator (response evaluator 420) that determines a response to the inputs. The response is forwarded to each of a verbal generator 430, and an NVB parameter selector. The verbal generator determines any necessary verbal response to the user inputs, and builds a language stream (including any of words, grammar, and timing).

For example, if the user inputs are a greeting "Hello Crash, how are you ?," the response evaluator 420 identifies a return greeting as an appropriate response, and the verbal generator produces language such as "Oh, I'm fine, how are you ?," perhaps including a timing of the words generated matching timing of known reply greetings. The words and any timing or other characteristics of the verbal communication are placed in a language, or verbal stream 435.

The parameter (NVB) selector 440 selects back channels, and/or other NVBs appropriate for communicating the response. In the above example, NVBs for extending a hand toward the user (e.g., communicating that the user is being spoken to) and raising an eyebrow (indicating that a question is being asked) may be selected.

A range of motions may be applied to any movements of the specified NVBs. The selected NVBs (parameters) 445 are sent to a modulator 450 for preparing a range of motion or magnitude of the NVBs (a process referred to as modulation). For example, extending of a hand, might be simple movement of a hand by, 30 degrees toward the user, or the hand extension may be a more elaborate action, involving and arm move and a grandiose twirling of the hand as it is extended toward the user.

Hints may also be provided to each of the parameter selector and modulator to help in the selection and modulation processes. In parameter selection, certain parameters might be excluded based on verbal content being generated. In modulation, magnitude of NVBs might be altered by punctuation (an exclamation mark, would indicate a higher NVB magnitude, for example).

Modulated NVBs 455 are sent to a context device 460 along with the verbal stream 435 that combines all behaviors (verbal and NVBs) into a data stream 465. The data stream 465 contains data representing an animation to be displayed by an animation system 470.

Figure 5:
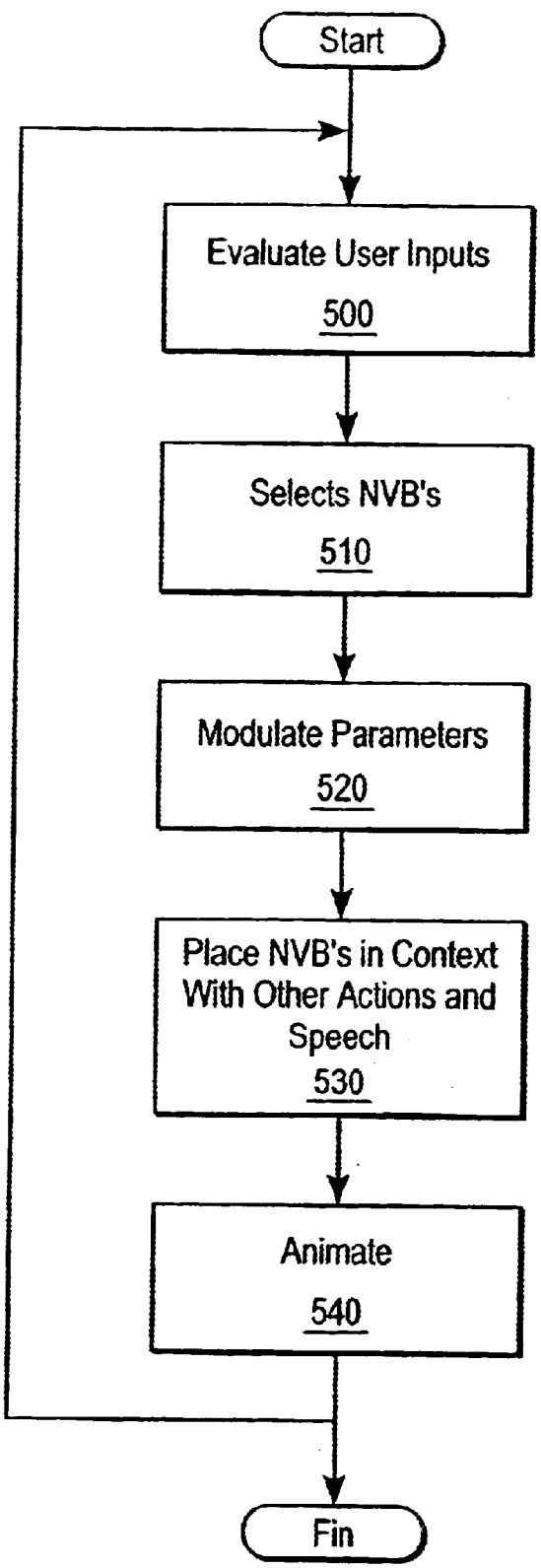
FIG. 5 is a flow chart illustrating one embodiment of processes of the present invention.

The processes of selecting parameters, modulation, and animation are illustrated by the flow chart of FIG. 5. At step 500, user inputs are evaluated. Based on this evaluation (or a response developed based on the user inputs), Social primitives are selected for carrying, reinforcing, or supplementing a communication. to be made to the user in response to the inputs (select NVBs, step 510).

At step 520, the parameters of a selected social primitive are modulated (e.g., specifying an amount of free space to be utilized by the NVB, degrees of freedom (DOF), tone, volume, etc). The modulated NVBs are placed in context with speech or other actions to be performed by the character. Context placement may be performed by placing identifiers of the NVBs into any type of speech or animation code (Microsoft Speech Synthesizer, or commercially available animation systems, for example). At step 540, the speech or animation code is input to an animation system for playing on the animated character.

Figure 6:
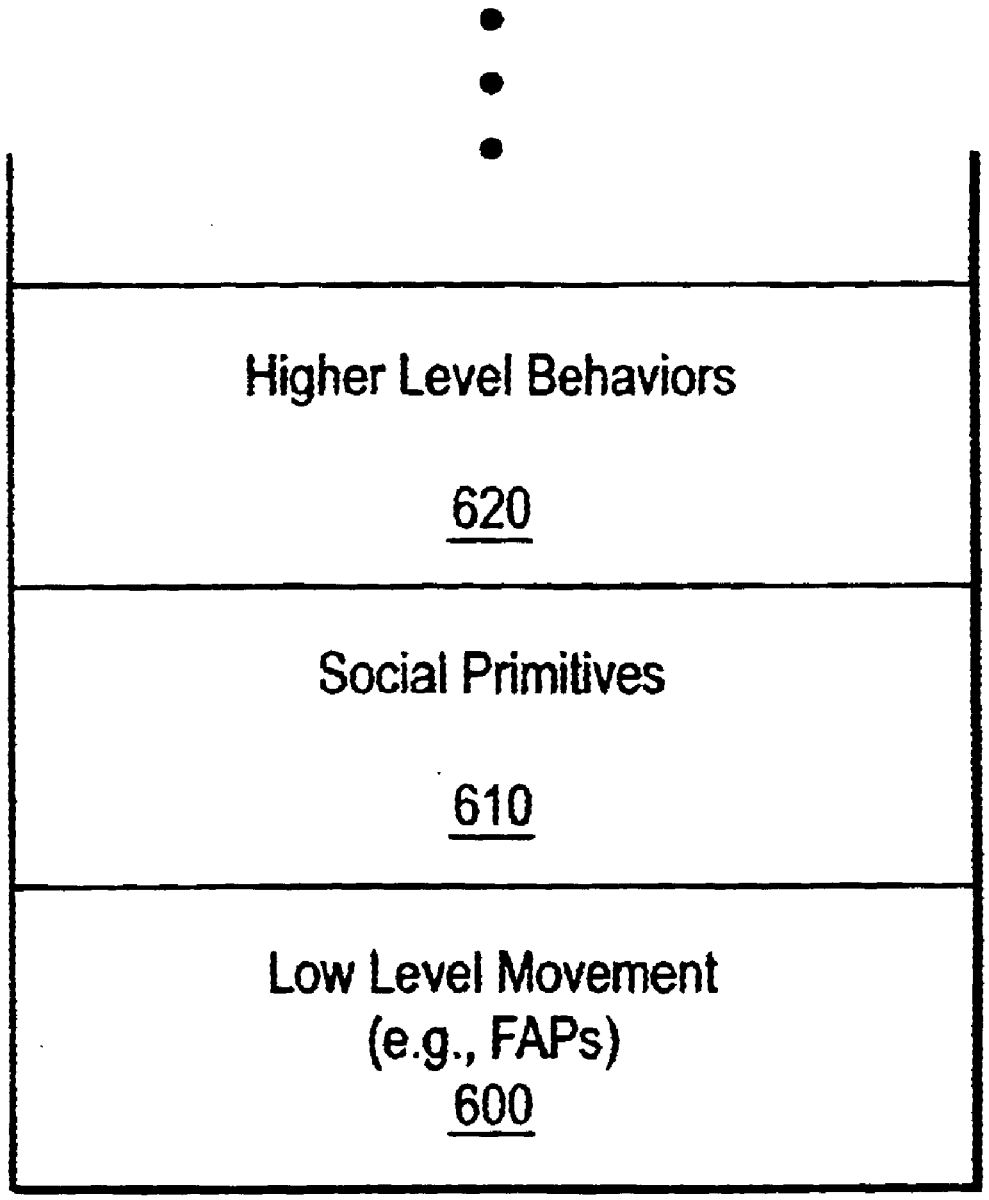
FIG. 6 is a hierarchy diagram of movements, parameters, social primitives, and higher level movements.

Referring to FIG. 6, which shows a hierarchy of low level movements 600 (FAPs, for example) upon which social primitives 610 and other higher level behaviors 620 are built. The social primitives are built from the various low level movements 610. For example, saccadic eye movement includes motions, or darting of eye contact during conversation or other actions. Such movements would be implemented by moving the eye up, down, sideways or other angles with specified constraints (the character always looking at a users face, for example). These movements would be implemented by activating low level movements 600. Therefore, in one embodiment, a database of social primitives identifying specific low level movements for implementing the social primitives is maintained. Similarly, other NVBs and higher level commands will also identify specific low level movements, or, additionally, other lower level movements maintained in the database for implementing the higher level behavior.

Figure 9:
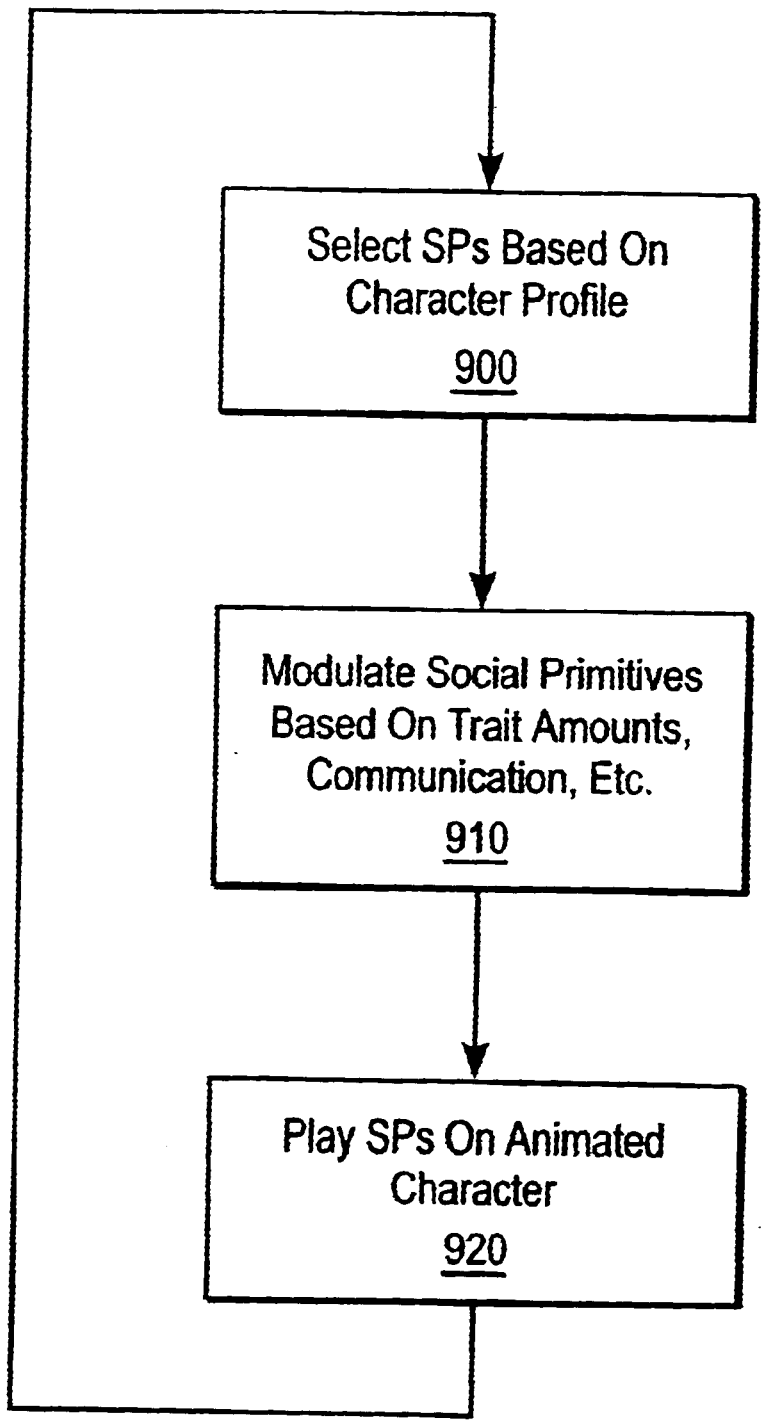
FIG. 9 is a flow chart illustrating an embodiment of a method for selection and modulation of social primitives.

Referring now to FIG. 9, there is illustrated a flow chart of one embodiment for selecting and modulating social primitives (also including NVBs and other higher level behaviors) in an autonomous animated character. At step 900, one or more Sps are selected. In one embodiment, the Sps are selected based on a profile of a character (See Cook, for one example of how to construct a character profile). Personality traits in the character profile are related to and therefore identify various Sps that the character will perform. For example, saccadic eye movement is an SP that is related to personality traits such as emotional stability, and warmth.

Once the Sps are selected, at step 910, the selected Sps are modulated. In one embodiment, the Sps are modulated based on an amount of traits identified in the character profile. For example, for the personality trait emotional stability (or neuroticism), a character may have an amount of 75 out of a possible score of 100, which would indicate a person low on emotional stability (i.e. tense, nervous, anxious). The modulation at step 910, would then modulate one or more social primitives so that the behavioral actions of the animated character would correspond to a person low in emotional stability. In this example, the saccadic eye movement of the animated character would dart around the users face more rapidly and more frequently than an average human, conveying that part of the character's personality. Accompanying eye movement with an increase in hand fidgeting would serve to reinforce that personality type even more.

The modulated Sps may be based on, as described above, the trait amounts present in a character profile, or based on a communication being performed by the character, or a combination of any of the above, and thereby add emphasis or meaning to the communication. NVB's of all types, including social primitives may be modulated in this manner. At step 920, the modulated sp, NVB, or other higher level behavior is played on the animated character.

Figure 10:
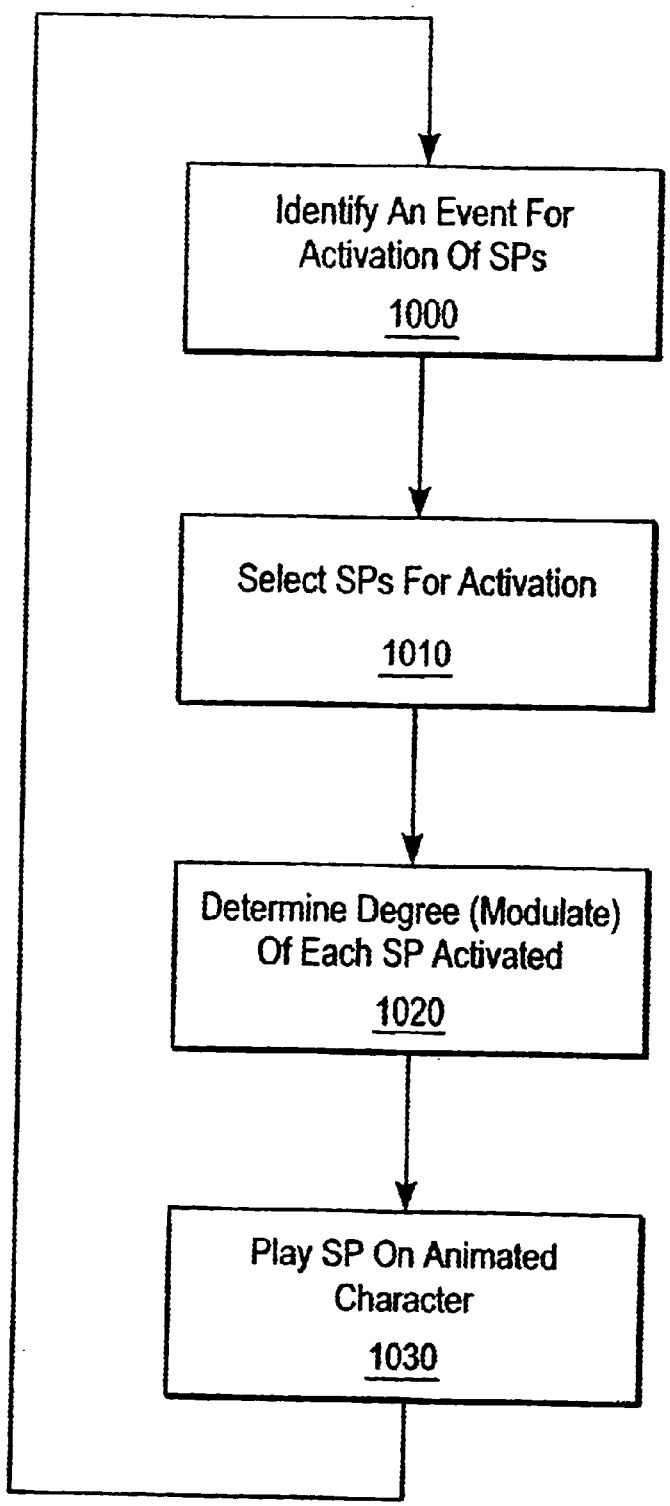
FIG. 10 is a flow chart illustrating another embodiment of a method for selection and modulation of social primitives.

FIG. 10 illustrates a second embodiment of a method for selecting and modulating social primitives and other NVBs. At step 1000, an event that will lead to activation of at least one SP is identified. The event could be any single event experienced by the character (e.g. waiting for a turn, interruption by a user while speaking), a sequence of events (explaining operation of a piece of equipment, for example), a communication to be made by the animated character, or events occurring around the animated character. At step 1010, Sps corresponding to the identified event are selected for activation.

Before activating the selected Sps, they are modulated (step 1020). In one embodiment, each SP includes a range (including any of amounts, arc, frequency, range of emphasis, degree of motion, etc.) in which the SP may be activated. More than one range may apply to an SP. For example, saccadic eye movement may be described in a frequency range that is typical for individuals of different personality type (e.g., 0 to 180 eye movements per minute, 0 reflecting a very calm person, and 180 reflecting a very nervous person). In addition, saccadic eye movement may also be described in terms of an average range of arc, 5 to 180 degrees (5 degrees average arc representing a very calm, or perhaps an intent person, and 180 degrees average arc representing a nervous or easily distracted person). Regardless of the ranges identified or the traits correlated to the Sps, the processes would remain the same.

Figure 11:
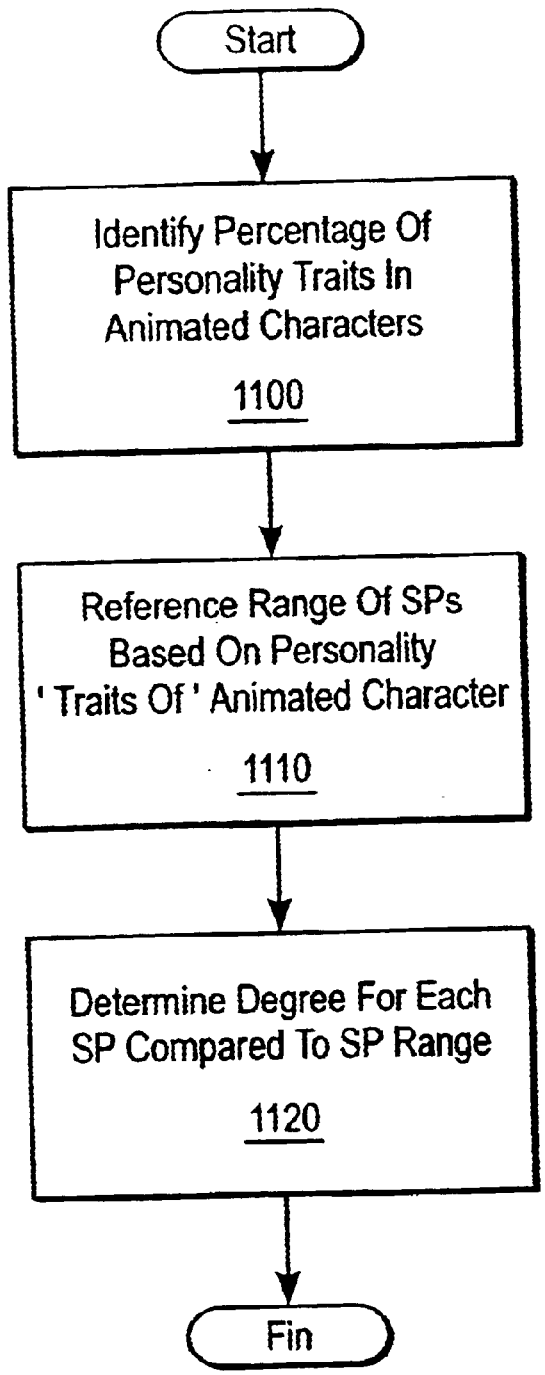
FIG. 11 is a flow chart illustrating one embodiment of a modulation process for social primitives and other behaviors (NVBs, for example)

FIG. 11 is a flow chart of one embodiment for performing the modulation of social primitives, NVBS, and other higher level behaviors. At step 1100, a percentage (or other amount) of personality traits of the animated character are identified. The personality traits may be selected by a programmer of the animated character, or selected by a user of the animated character, via a personality workbench, for example (see Cook, discussed above).

Figures 12, 13:
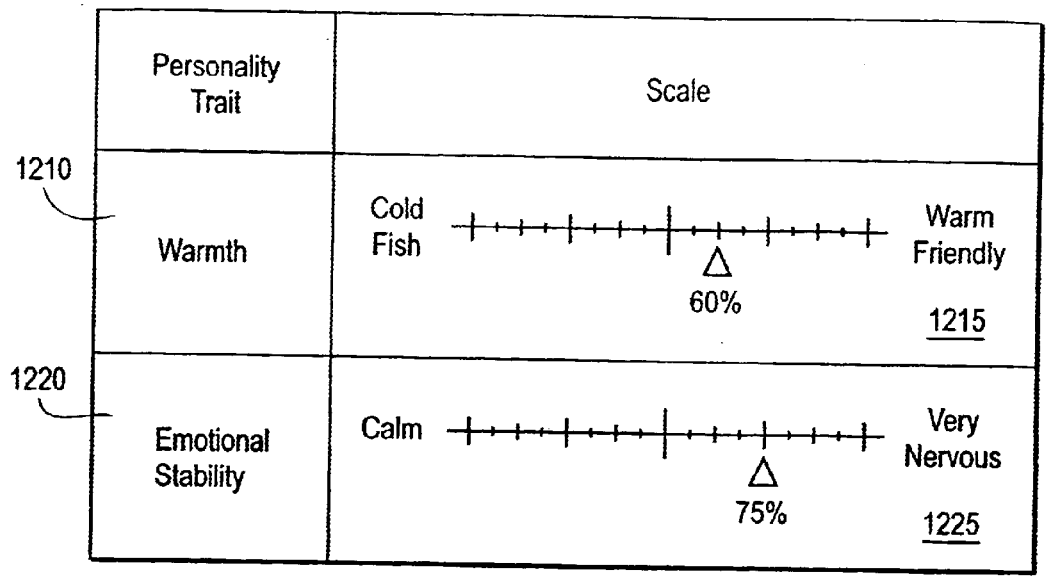
FIG. 12 is a graphic representation of an exemplary character profile.
FIG. 13 is a chart illustrating an example listing that relates social primitives and a range of motion for each primitive to personality traits.

Referring to FIG. 12, a graphic example of one part of a character profile identifying personality traits and an amount (percentage in this example) of the personality traits. In this example, personality traits warmth 1210 and emotional stability 1220 are identified along with a scale for each trait. Referring to warmth, the warmth scale 1215 indicates that the character associated with the character profile of FIG. 12 normally exhibits warmth at 60%, or about 10% more than the average person. Similarly, the emotional stability scale 1225 indicates that the character would exhibit emotional stability at about 75%, or 25% more emotional stability than the average person, for example.

Returning now to FIG. 11, at step 1110, a range of SP actions based on personality traits is referenced. In one embodiment, a range of SP actions is maintained in a table as illustrated in FIG. 13. As seen in the example of FIG. 13, primitives saccadic eye movement 1300 and hand fidgeting 1330 are illustrated. Traits are associated with each primitive (e.g. emotional stability and warmth), and a range of values for each trait of each primitive are identified (e.g., ranges 1320 and 1330). For example, the primitive saccadic eye movement 1300 has corresponding ranges for traits emotional stability (0 to 180 movements per minute) and warmth (15 to 25 moves per minute). For hand fidgeting, a range for the emotional stability trait is also shown (0 to 100 fidgets per minute), but none is shown for warmth, which, in this example, would not be a trait that affects hand fidgeting. It is important to note that some implementations may utilize different ranges and correlate different (more or less) traits to similar or different primitives, what is important is the process of selecting the primitives and modulating them based on available data.

Again, in FIG. 11, at step 1120, a degree modulation) of the SP, NVB, or other higher level behavior) is determined by comparing the amount of personality traits to the SP range for each SP and rait. Using the example scales, and ranges in FIGS. 12 and 13, for example, hand fidgeting would be implemented at a rate of 60% of the range specified in FIG. 13 (6–10 fidgets per minute). The scales need not be linear and may be. based on curves (quadratic equations, etc). For example, hand fidgeting for a nervous person may be have a range of 1 . . . 100, but based on an $x^4$ curve, such that a 60% warmth person would have only 10 or 20 hand fidgets per minute. Any type of range calculations may be utilized.

In addition, when more than one trait associated with an SP has ranges (e.g., saccadic eye movement of FIG. 13 having both traits of emotional stability and warmth affecting the range of movement), a mechanism for determining the amount of movement needs to be implemented. In one embodiment, a selected (stronger) trait may be used to dominate the amount of movement, in this case, if warmth is a selected trait, the emotional stability component of saccadic eye movement could be ignored. In another embodiment, the various components are averaged, and in another embodiment, the components are weighted and then averaged. Other methods for combining, averaging, or weighting the various components may be utilized.

An example for determining saccadic eye movements in one embodiment utilizing averaging and weighted averaging is illustrated below.

Given:
   Personality illustrated in FIG. 12; and
   SP/NVB listing of FIG. 13, which, in this example, relates to the event: waiting for a turn.

Process:
   Step 1: Identify event (waiting for a turn);
   Step 2: Select Sps (saccadic eye movement and hand fidgeting); and
   Step 3: Determine modulation of each SP.

Calculations:
   Two traits related to waiting for a turn: (1) emotional stability; and (2) warmth.
      (1) emotional stability–60% of 0 . . . 180=108; and
      (2) warmth–75% of 15 . . . 25=22.5.

Average
   (108+22.5)/2=65.25 moves/min

Weighted Average
   (5/6)(108)+(1/6)(22.5)=93.75 moves/min
   One trait related to hand fidgeting, emotional stability.
   75% of 1 . . . 100/min=75/min Therefore, using this example, an animated character would have saccadic eye movements invoked at a rate of 65.25 or 93.75 moves/min (depending on averaging technique), and hand fidgeting of 75/min. Again, the specified rates are provided for illustrating the process, and not to limit any implementation discussed or claimed herein.

The present invention may be practiced utilizing virtually any animated character system. For example, Prevost et al. (hereinafter Prevost), U.S. Pat. No. 6,570,555, U.S. patent application Ser. No. 09/223,637, entitled "Method and Apparatus for Embodied Conversation Characters with Multimodal I/O in an Interface Device" filed Dec. 30, 1998, incorporated herein by reference, in its entirety, teaches an animated character architecture that utilizes a reaction module for determining fast responses to users inputs, and a dialog manager for determining detailed responses based an in-depth analysis of the user inputs. Either of the reaction module or dialog manager of Prevost may utilize devices and processes according to the present invention.

For example, the reaction module may select multiple NVBs (via a parameter selection device, for example), and modulate the selected NVBs, each of selection and modulation based on speech and vision inputs provided to the reaction module. In another example, the dialog manager may utilize the same process of the action device 400 for determining an output to the animation system of Prevost.

In another example, Prevost, U.S. Pat. No. 6,384,829, U.S. patent application Ser. No. 09/447,932, entitled "STREAMLINED ARCHITECTURE FOR EMBODIED CONVERSATIONAL CHARACTERS WITH REDUCED MESSAGE TRAFFIC," filed Nov. 24, 1998 incorporated herein by reference, in it's entirety, teaches another animated character system in which the present invention may be utilized. Other examples, including any of the background referenced autonomous, conversational, animated, or synthetic characters, including, Microsoft Office Assistant, Microsoft Agent, IBM's Warp Guide, Extempo's Imp software, and the BASA Alive architecture may utilize the teachings of the present invention to make a more effectively engaging user interface.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes and methods of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the processing of the present invention. Such software may include, but is not limited to, device drivers, peripheral equipment programs, operating systems, and user applications. Ultimately, such computer readable media further includes software for performing the functions of the present invention as described above.

Included in the programming (software) of the general/specialized computer or microprocessor are software modules for implementing the teachings of the present invention, including, but not limited to, input and identification and/or evaluation of user inputs, selection and modulation of NVB parameters, and selection and activation of personality NVBs in context with other actions (e.g., movements, speech) of a synthetic character, animated character (e.g., 2-D, or 3-D display or models), or other display, and the communication of such NVBs and actions to an animation system or other output via any of direct or remote connections to the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of modulating social primitives in an autonomous animated character, comprising the steps of:

determining a set of personality traits of said autonomous animated character;

selecting at least one social primitive from social primitives related to said set of personality traits to be activated in said autonomous animated character;

modulating each of said social primitives to be activated on said autonomous animated character; and causing said autonomous animated character to produce each selected modulated social primitive.

2. The method according to claim 1, wherein said step of determining a set of personality traits comprises the step of:

reading a character profile constructed to identify amounts of personality traits to be evident in said autonomous animated character.

3. The method according to claim 1, wherein said step of selecting comprises the steps of:

identifying an event or sequence of events that are at least one of, being performed by said autonomous animated character, occurring near said autonomous animated character, and relating to communications being performed by said autonomous animated character, wherein said event or sequence of events would result in display of at least one social primitive by said autonomous animated character if said autonomous animated character was acted similarly to a statistically average human; and selecting at least one social primitive to be activated in said autonomous animated character based on said event or sequence of events identified.

4. The method according to claim 3, wherein said step of modulating comprises the step of modulating said social primitives based on at least one of a character profile that identifies an amount of personality traits related to said social primitives, and said event or sequence of events identified.

5. The method according to claim 4, wherein said step of modulating comprises the steps of:

identifying an amount of each personality trait in said character profile related to the selected social primitives;

identifying a statistical range comprising at least one of an amount, frequency, degree, arc, range of motions, and other qualities associated with each of the selected social primitives; and applying said amount of each personality trait to each of said statistical ranges to determine at least one of an amount, frequency, degree, arc, range of motions, and other qualities as a modulation for each of said social primitives.

6. The method according to claim 1, wherein said step of modulating comprises the step of modulating said social primitives based on a character profile of said autonomous animated character that identifies amounts of personality traits related to said social primitives.

7. The method according to claim 6, wherein said step of modulating comprises the steps of:

identifying an amount of each personality trait in said character profile related to the selected social primitives;

identifying a statistical range comprising at least one of an amount, frequency, degree, arc, range of motions, and other qualities associated with each of the selected social primitives; and applying said amount of each personality trait to each of said statistical ranges to determine at least one of an amount, frequency, degree, arc, range of motions, and other qualities as a modulation for each of said social primitives.

8. The method according to claim 1, wherein said step of modulating a degree comprises the steps of:

identifying a percentage of each personality trait associated with said autonomous animated character;

referencing a listing of social primitives identifying a range of values for implementing each social primitive based on personality traits; and determining said degree for each social primitive based on said percentage of each personality trait compared to the range of values in said listing.

9. The method according to claim 8, wherein said step of identifying includes the step of:

reading a character profile containing personality traits associated with said autonomous animated character and a percentage of each personality trait to be present in said autonomous animated character.

* * * * *